US008245009B2

United States Patent
Kirscht et al.

(10) Patent No.: US 8,245,009 B2
(45) Date of Patent: *Aug. 14, 2012

(54) SIMULATING MEMORY HOT ADD

(75) Inventors: Joseph Allen Kirscht, Rochester, MN (US); Sumeet Kochar, Apex, NC (US); Barry Alan Kritt, Raleigh, NC (US); William Bradley Schwartz, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,139

(22) Filed: Jun. 16, 2011

(65) Prior Publication Data

US 2011/0246744 A1    Oct. 6, 2011

Related U.S. Application Data

(63) Continuation of application No. 12/120,383, filed on May 14, 2008, now Pat. No. 7,987,336.

(51) Int. Cl.
*G06F 12/00* (2006.01)
(52) U.S. Cl. ...................................... 711/173
(58) Field of Classification Search .................. None
See application file for complete search history.

(56) References Cited

U.S. PATENT DOCUMENTS

| 7,987,336 B2 * | 7/2011 | Kirscht et al. ............... 711/173 |
| 2004/0158701 A1 | 8/2004 | Merkin |
| 2005/0216721 A1 | 9/2005 | Zimmer et al. |
| 2007/0260672 A1 | 11/2007 | Almeida et al. |
| 2008/0052483 A1 | 2/2008 | Rangarajan et al. |

OTHER PUBLICATIONS

"Hot-Add Memory Support in Windows Server 2003," Windows Hardware Developer Central, Dec. 10, 2004, 4 pages, Microsoft, USA.
"Hot-Add Memory Support in Windows Server," Windows Hardware Developer Central, Oct. 28, 2010, 5 pages, Microsoft, USA.

* cited by examiner

*Primary Examiner* — Hiep Nguyen
(74) *Attorney, Agent, or Firm* — Matthew C. Zehrer

(57) ABSTRACT

Memory is logically partitioned into two regions. A first region may be a similar size relative to the second region or the first region may be a small subset of the memory. The first region of memory is initialized and an operating system utilizes the first region. A system handler simulates a physical hot add of the second region. After the simulated physical hot add, the operating system may utilize the second region as if it were newly added physical memory and/or may utilize both the first region and second region.

20 Claims, 3 Drawing Sheets

SIMULATING MEMORY HOT ADD

CROSS REFERENCE

This application is a continuation of U.S. patent application Ser. No. 12/120,383, which was filed on May 14, 2008 and is entitled "REDUCING POWER-ON TIME BY SIMULATING OPERATING SYSTEM MEMORY HOT ADD."

SUMMARY OF THE INVENTION

The present invention generally relates to simulating a physical hot add of a portion of memory.

During the power-on of a computer there is a sequence of events that occur before a user can utilize the computer. Early in this sequence of events, system firmware (frequently called Power on Self Test/Basic Input Output System—POST/ BIOS—on Intel PC systems) initializes and tests the system hardware. This initialization and testing can take several minutes to complete, which delays subsequent steps such as loading the operating system (OS) and other applications. Reducing this delay is important to satisfying the computer customer.

There are many items in the computer that need to be initialized and/or tested. Particularly the item that usually takes the greatest time to initialize is system memory. In many computer systems, the system memory uses Error Checking & Correction (ECC) algorithms/circuitry to detect and/or correct failures of particular bits in the memory array. Initializing ECC memory typically consists of writing data to every memory location thereby setting the memory to known values with matching ECC bits. In addition, this memory can be read back in order to validate the memory/ECC, and additionally can be written/verified with other data patterns to ensure the integrity of the system memory. This must be completed before the OS is loaded, since accessing memory before the memory is verified or before ECC bits are set, can result in uncorrectable memory errors which could cause data integrity problems and/or systems halts.

Some systems use memory controllers that have the ability to aid in the memory initialization/testing, by providing capabilities to set (write known values to memory), and scrub (read/verify/correct memory) without the system processor being involved (and as a result, at a much faster rate). Even with this type of memory controller, it often takes 4-10+ minutes to perform the memory initialization/testing before the operating system can boot.

In a particular embodiment, installed system memory is logically divided into two regions. A first region may be a similar size relative to the second region, or the first region may be a small subset of the memory. In another embodiment the size of the first region is greater than the amount required for system firmware (e.g., POST/BIOS, etc.) to complete system initialization, and for the OS to startup. In another embodiment the first region has enough memory to allow applications to begin running. In another embodiment the actual size of the first region is configurable by the user. In another embodiment a second region is the remainder of the memory. In yet another embodiment the second region is the large majority of the system memory.

In other embodiments, the first region of memory is initialized and an operating system utilizes the first region. A system handler may simulate a physical hot add of the second region of memory. In certain embodiments the operating system utilizes the second region as if it were newly added physical memory upon the simulated physical hot add and/or the operating system utilizes both the first region and second region upon the simulated physical hot add event.

These and other features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Some computer systems (such as IBM x460) and operating systems (such as Windows Server 2003, Enterprise Edition) support the capability known as Hot Memory Add. This capability allows for the addition of physical memory while the hardware is powered on, and the operating system is running. This is accomplished by 1) sensing circuitry on the computer that senses memory latch movement, and as a result, SMI code is invoked to control power and initialization of memory, 2) when memory has been configured, the operating system is notified of a memory change event (using ACPI), and then 3) the operating system determines the new memory configuration, and begins using the memory that has been "Hot Added".

This invention generally provides a method for speeding up system boot time, by initializing a subset of memory during the system firmware test/initialization time, and allowing the system to boot an operating system with this subset of installed memory. While the system is completing operating system booting with the subset of installed memory, a remainder of the installed system memory is being initialized/tested. When the memory controllers or system firmware have began/completed initializing the remainder of system memory (and after the OS has booted), the SMI handler is invoked. The SMI handler then simulates a physical memory "Hot Add" event, and reports the event to the OS. This allows much of the memory initialization/test activity to occur in parallel with the firmware initialization/test and operating system startup processes, reducing the time from power on to OS booting.

Figure 1:
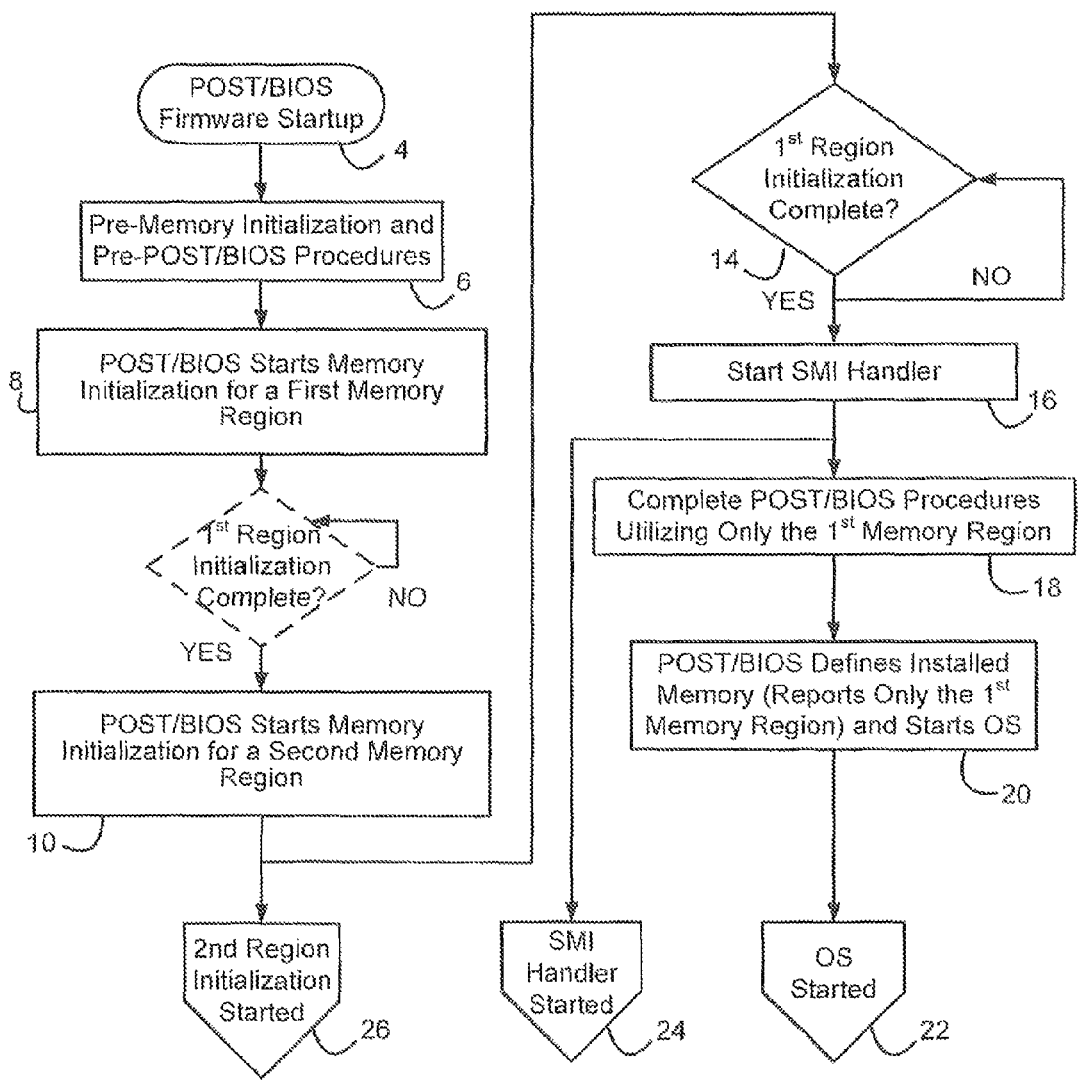
FIG. 1 depicts a POST/BIOS flow diagram prior to the operating system boot, according to an embodiment of the present invention.

Please refer to FIG. 1. FIG. 1 depicts a system firmware (i.e., POST/BIOS, etc.) flow diagram prior to the operating system boot, according to an embodiment of the present invention. The POST/BIOS flow process begins with the POST/BIOS Firmware Startup (block 4). Subsequently, Pre- Memory Initialization and Pre-POST/BIOS procedures occur (block 6). POST/BIOS procedures and/or memory initialization or testing and/or memory scrub occur in a first memory region (block 8). In an embodiment, the first memory region is one of two logical divisions of a system memory. In another embodiment, the first memory region is a relatively small amount of memory when compared to a second memory region. The second memory region is the remainder of the system memory. The second memory region would typically be the large majority of the system memory. In a particular embodiment, the size of the first memory region is larger than the amount of memory required for the POST/BIOS procedures to complete and for the operating system to boot. In another embodiment the first memory region is large enough for system applications to begin running. In another embodiment, the actual size of the first memory region may be configurable by a user. In another embodiment, once the POST/BIOS procedures and/or memory initialization and/or memory scrub complete for the first memory region, the ACPI table is set to show the first memory as being installed and available (SRAT table).

POST/BIOS procedures and/or memory initialization/testing and/or memory scrub occur for the second memory region (block 10). Since the first memory region is smaller than the second memory region, the POST/BIOS procedures, memory initialization, and memory scrub are completed faster for the first memory region as compared to the second memory region. In another embodiment, the POST/BIOS procedures, memory initialization, and memory scrub for the second memory region are completed only after the same is completed for the first memory region. The POST/BIOS procedures and/or memory initialization/testing and/or memory scrub for the second memory region relate to further processes, discussed infra, starting at block 26.

Once the memory initialization/test and/or the memory scrub are completed for the first memory region (block 14), the SMI Interrupt Handler is started (block 16). The SMI Interrupt Handler relates to further processes, discussed infra, starting at block 24. The POST/BIOS procedures are completed utilizing only the first memory region (block 18). The POST/BIOS defines the installed memory, reporting only the first region memory, and starts the operating system (block 20). The OS start relates to further process, discussed infra, starting at block 22.

Figure 2:
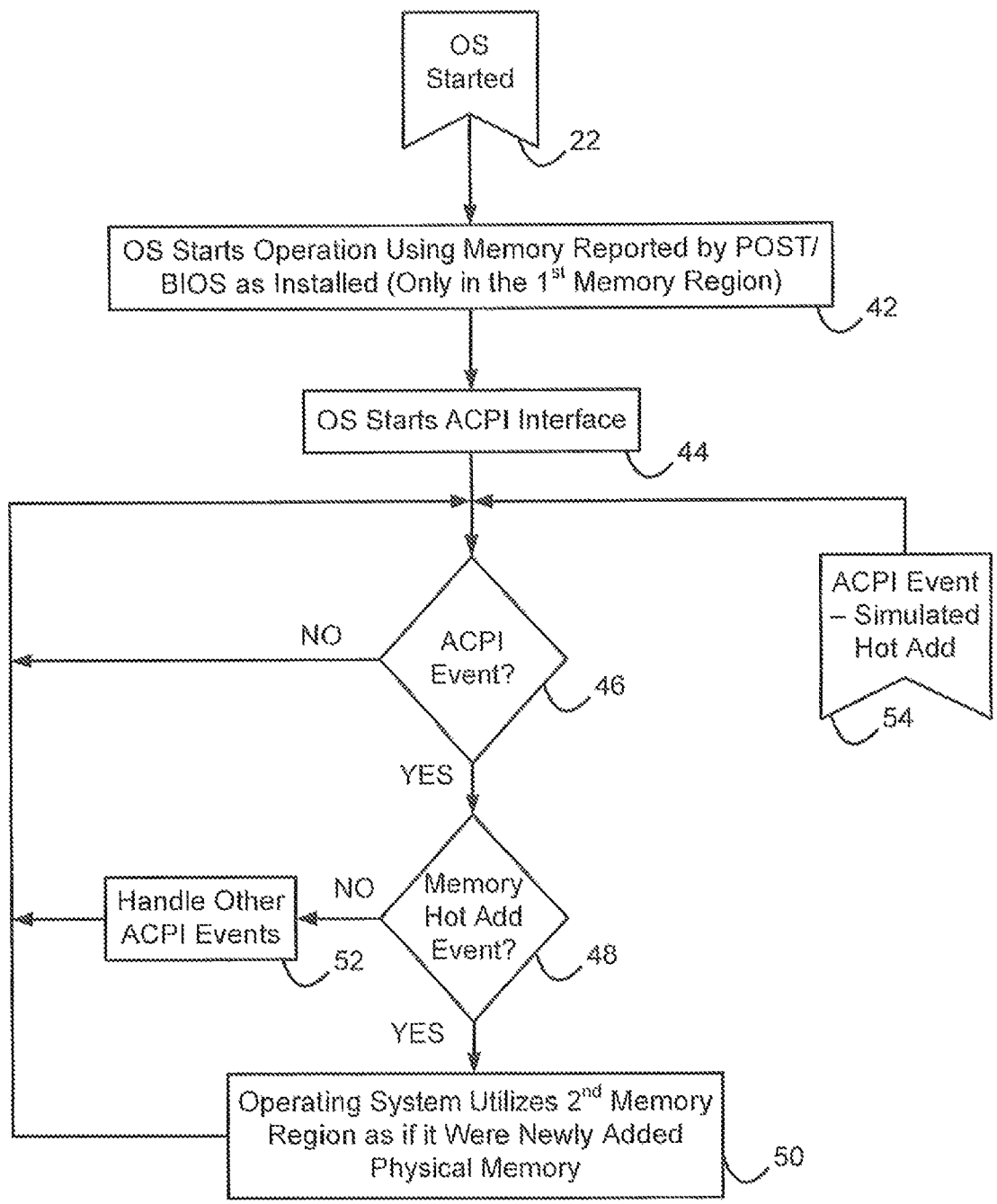
FIG. 2 depicts a simulated memory hot add flow diagram after the operating system boot, according to an embodiment of the present invention.

Please refer to FIG. 2. FIG. 2 depicts a simulated memory hot add flow diagram after the operating system boot, according to an embodiment of the present invention. The simulated memory hot add flow process begins at block 22. The operating system starts operation using memory reported by POST/BIOS as installed (block 42). The memory reported is the memory from the first region. Subsequently, the operating system starts the ACPI interface. In a certain embodiment the ACPI table is set to show that the first memory region is installed and available (SRAT table).

The SMI Handler code simulates the addition of physical memory (block 54). This simulation event is discussed infra. Subsequently the operating system starts the ACPI interface, thereby allowing for ACPI events (block 44). If there is an ACPI event (block 46) and a memory hot add event (block 48), the memory reported as hot plugged is added to the memory pool (i.e., system memory, etc.), (block 50). In other words the operating system starts utilizing the second memory region as if it were newly added physical memory. If there has not been a simulated hot add event, but the operating system has issued an ACPI event, the OS processes the other ACPI event(s) (i.e., non memory hot add event), (block 52).

Figure 3:
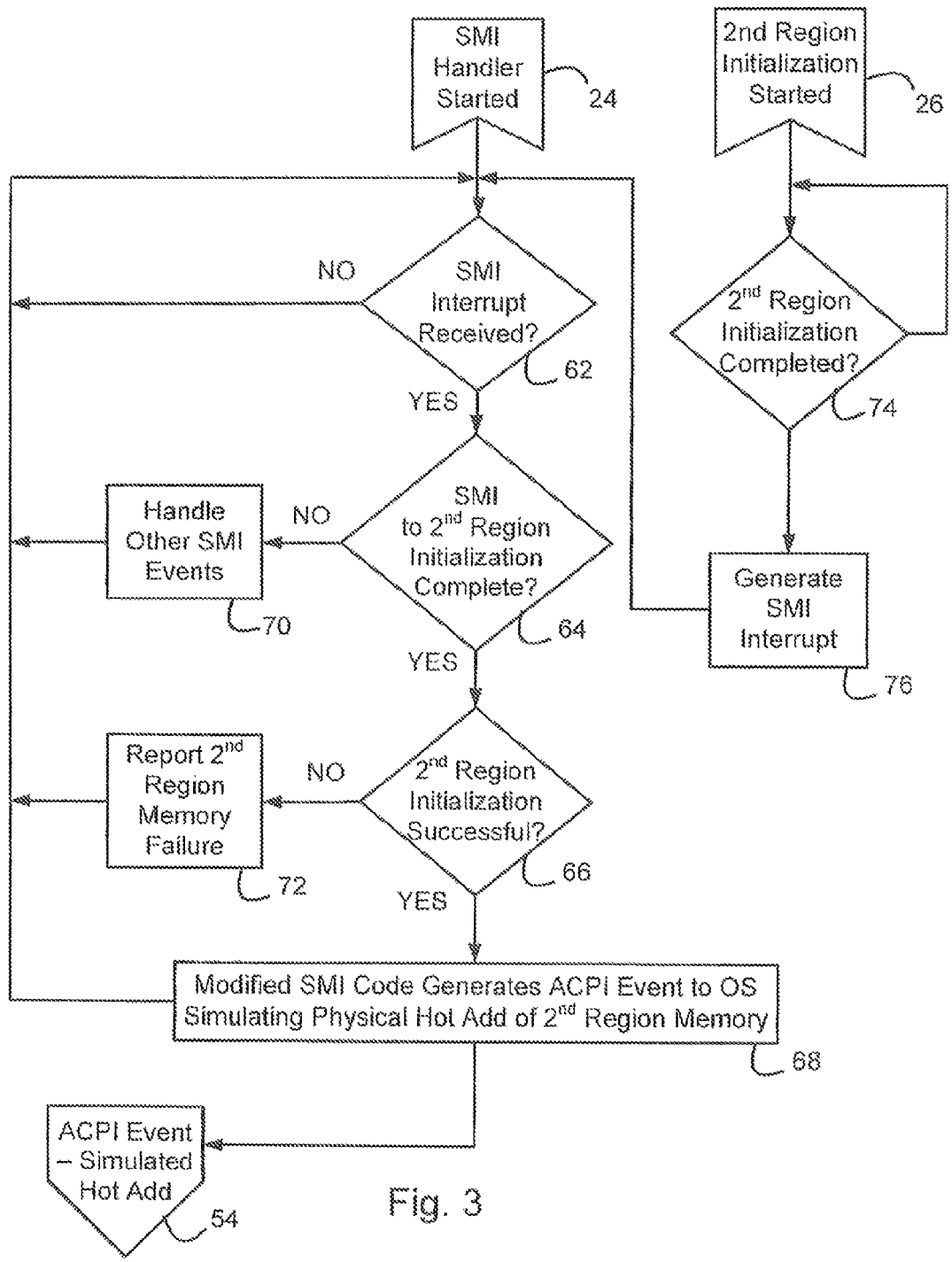
FIG. 3 depicts a simulated memory hot add flow diagram after the operating system boot, according to an embodiment of the present invention.

Please refer to FIG. 3. FIG. 3 depicts a simulated memory hot add flow diagram after the operating system boot, according to an embodiment of the present invention. FIG. 3 further describes a process for generating an ACPI event simulating a memory hot add event (i.e., block 54). The process for generating an ACPI event simulating a memory hot add event begins at blocks 24 and 26 (blocks 24 and 26 were mentioned above). The SMI Handler starts (block 24) and the second memory region initialization/scrub starts (block 26). Once the second memory region completes the initialization/scrub (block 74), a SMI interrupt is generated (block 76).

If an SMI Interrupt is received (block 62), and there is an SMI because the second region initialization/scrub is complete (block 64), and if the second region initialization is successful (block 66) a modified SMI code generates an ACPI event to the operating system thereby simulating the memory hot add of the second region memory (block 68). In an SMI interrupt is received (block 62) but the SMI event is not due to the second region initialization being complete (block 64), the SMI handler processes the other SMI events (block 70). If an SMI Interrupt is received (block 62), and there is an SMI because the second region initialization/scrub is complete (block 64), but the second region initialization/scrub was not successful (block 66), a report is generated indicating that the second region initialization/scrub failed (block 72).

Please note that various embodiments of the methodology require memory scrubbers that can define start/stop scrub regions based on physical addresses (Such as address range of 0-2 GB), since that is how memory is seen by the system processor. Some memory scrubbers operate after memory address translation has take place, and scrub with a sequence based on memory subsystem addressing (i.e., addressed by rank, banks, rows, columns, etc.)

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "method", or other meaningful nomenclature. Therefore, it is desired that the embodiments described herein be considered in all respects as illustrative, not restrictive, and that reference be made to the appended claims for determining the scope of the invention.

The invention claimed is:

1. A computer system comprising:
    a memory logically partitioned into a first region and a second region;
    a memory controller configured to initialize the first region;
    an operating system configured to utilize the first region; and
    a system handler configured to simulate a physical hot add of the second region.

2. The computer system of claim 1 wherein the memory controller initializes the second region subsequent to the initialization of the first region.

3. The computer system of claim 1 wherein the operating system utilizes the second region as if it were newly added physical memory upon the simulated physical hot add.

4. The computer system of claim 1 wherein the operating system utilizes both the first region and second region upon the simulated physical hot add event.

5. A method for utilizing memory comprising:
   logically partitioning a memory into a first region and a second region;
   initializing, by a memory controller, the first region;
   utilizing, by an operating system, the first region; and
   simulating, by a system handler, a physical hot add of the second region.

6. The method of claim 5 wherein the first region is relatively small compared to the second region.

7. The method of claim 5 wherein simulating a physical hot add of the second region memory is completed subsequent to the initialization of the second region.

8. The method of claim 5 wherein the operating system utilizes the second region as if it were newly added physical memory upon the physical hot add of the second region.

9. The method of claim 5 wherein the operating system utilizes both the first region and the second region upon the physical hot add of the second region.

10. The method of claim 5 wherein the first region is large enough for use by operating system applications.

11. The method of claim 5 wherein the size of the first region is large enough to complete initialization and for the operating system to startup.

12. The method of claim 5 wherein the size of the first region is configurable by a user.

13. A computer program product comprising:
   a non-transitory computer readable storage medium having computer readable program code embodied therewith, the computer readable program code comprising:
   computer readable program code configured to:
      logically partition a memory into a first region and a second region;
      initialize the first region;
      limit the utilization to only the first region; and
      simulate a physical hot add of the second region.

14. The computer program product of claim 13 wherein the first region is relatively small compared to the second region.

15. The computer program product of claim 13 wherein simulating a physical hot add of the second region memory is completed subsequent to the initialization of the second region.

16. The computer program product of claim 13 wherein the operating system utilizes the second region as if it were newly added physical memory upon the physical hot add of the second region.

17. The computer program product of claim 13 wherein the operating system utilizes both the first region and the second region upon the physical hot add of the second region.

18. The computer program product of claim 13 wherein the first region is large enough for use by operating system applications.

19. The computer program product of claim 13 wherein the size of the first region is large enough to complete initialization and for the operating system to startup.

20. The computer program product of claim 13 wherein the size of the first region is configurable by a user.

\* \* \* \* \*